Patented Aug. 8, 1933

1,921,309

UNITED STATES PATENT OFFICE 1,921,309

FILTER MATERIAL AND METHOD OF PRODUCING THE SAME

Earle D. Crammond, Washington, D. C., and William A. Hughes, Morristown, N. J., assignors to The Harvel Corporation, a Corporation of New Jersey No Drawing. Application June 3, 1930
Serial No. 459,107

2 Claims. (Cl. 210—204)

The present invention relates, generally, to the art of filtering, and relates, more specifically, to elements which function in the separation of solids from liquids, heavy liquids from thinner liquids, for separating the constituents of emulsion, and for use in the art of filtering, generally.

It is an object of the invention to provide filtering elements which have an impregnation or a surface coating of a material which has the characteristic of resisting the action of chemicals, solvents hot and cold water, steam, and so on and of resisting heat.

Other objects and advantages of the invention will be apparent from the following description thereof.

The present invention is based on the fact that certain products prepared from cashew nut shell liquid are resistant to the action of certain acids, alkalis and other chemicals; to the solvent action of materials such as alcohol, benzol, naptha, gasoline and other petroleum products, hot and cold water, and steam; and withstand heat and changes in temperature. Such cashew nut shell liquid products are described in United States Letter Patent 1,725,791 to 1,725,797, inclusive, issued to M. T. Harvey, August 27, 1929 to which reference is hereby made. There products are prepared by heating cashew nut shell liquid to form a dry film thereof, by reacting it with one or both of a drier and formaldehyde, and in other ways disclosed by said Harvey patents.

The cashew nut shell liquid products are used for impregnation or for coating, as the case may be, media such as paper; cloth; foraminous wire mesh; fibrous material, such as wood and metal wool; pourous blocks or bodies; particles of infusorial earth, kieselguhr, and other materials; to protect the surfaces of media, particularly at the passageways defined therein and arranged and provided for the conduction of the liquid being treated and of the resulting filtrate.

The cashew nut shell liquid products have a particular advantage when used to coat or impregnate the surfaces or fibers of paper, cloth and other materials used in edge filters because cashew nut shell liquid films have minute raised portions at the surface thereof. This is particularly true of films, such as varnish films, made of high percentages of this liquid. These minute raised portions are caused by the high surface tension of this liquid, which tension tends to gather the liquid into separated accumulations. This gathering of the varnish or coating into denticles is enhanced by the adhesion of the coating material to the cilia of pubescent surfaces, such for example as the surface of wood, paper and cloth. The pubescence may occur naturally or can be produced or, being present naturally, can be increased by methods and means generally known in the arts for raising the fiber of wood and paper and for raising the nap of cloth. Separation, however, does not occur and the film produced is continuous throughout. Further, the varnish and other films or coatings made of cashew nut shell liquid are formed intact throughout and have no pores nor minute openings such as occur in varnishes and films made from linseed and other oils. This is another advantage of the present invention, in that and because none of the liquid being treated nor the filtrate can penetrate or pass through to the medium used to define the filter passageways.

When two surfaces are placed against each other, one or both having a cashew nut shell liquid varnish or other product thereat, a tortuous passageway will be defined, the depth of which can be varied by applying and regulating or adjusting pressure to hold said surfaces together. Such a passageway or passageways serve to separate solid or liquids from the filtrate, in a manner known in the art.

Also the varnishes and other preparations made from cashew nut shell liquid as described in the Harvey Patents 1,725,791 to 1,725,797, inclusive, above referred to, can be used for printing on paper of various kinds and on parchment, sheet metal and other materials to make edge filtering elements. The impression printed can be in the shape of dots and/or lines or other configurations to define filtering passageways connecting feed and discharge openings or edges of the sheet or plate upon which the printing impression is made.

The paper, parchment or other material upon which the printed impression is made, in some cases, is provided with a coating or surface of a cashew nut shell liquid material before the dots, lines or other configurations are printed thereon; and in other cases the dots, lines or other configurations are printed onto the surface of the sheet or plate without the coating or surfacing of cashew nut shell liquid material. In still other cases the dots, lines or other configurations of a cashew nut shell liquid material are printed onto the sheet or plate of paper, parchment or other material and afterward a coating or surfacing of a varnish or other cashew nut shell liquid product is applied over the said printed impression. Also variations of these steps can be made such as alternate and successive printings and surfacings to produce a product which will act as a filter element and which will, in addition, withstand for an effective time the wearing and destroying action of the materials being filtered.

In all of these cases where dots, lines or other configurations are impressed on a surface by printing the object is to provide raised portions which extend in the neighborhood of one-one thousandth of an inch or less above the adjoining surface to define filtering channels of minute depth for the separation of fine particles, colloids and emulsions into their constituent parts.

Filtering units or bodies can also be made of blocks, sheets, shreds and comminuted particles composed entirely of cashew nut shell liquid products. Also mineral wool, glass wool, cotton fibers, wool fibers, metal turnings and the like can be treated to provide thereon a protective coating of a cashew nut shell liquid varnish or other products. Fine particles can also be treated in a similar manner for filtering purposes; and materials for such particles can be, for example, sand, glass, diatomaceous earths, slate dust, saw dust, cork dust, or any material to give fine bodies which when packed together define filtering passageways whose size is more or less fine, as desired and as determined by the size of the particles used for any given purpose, the cashew nut shell liquid varnish or other product being used to provide a resistant coating thereover which separates the material of the particles from the material being filtered.

In filters of the screen or sieve type, whether made of wire or other materials such as textile fabrics, the protective coating of cashew nut shell liquid material can be applied either before or after or both before and after the strand is woven to form the mesh.

The Harvey Patents 1,725,791, to 1,725,797, inclusive, above mentioned, are hereby referred to as a source of information for varnishes and other products of cashew nut shell liquid suitable for use in the application of the present invention, however the following examples are given for purposes of illustration. (1) A baking varnish made of approximately 80 parts of cashew nut shell liquid which has been heated to 600° F., 20 parts of linseed oil, and drier composed of 1 part litharge and 1 part manganese resinate is suitable for edge filters made of layers of paper coated with this varnish because the resultant varnished sheet has flexibility, resistance to mechanical abrasion, and resistance to the action of solvents and chemicals. (2) Another example is a varnish made of about 85 parts cashew nut shell liquid which has been heated to about 450° F., about 15 parts of commercial formaldehyde, and about 4 parts of manganese resinate, this varnish being suitable for coating filtering surfaces generally and, particularly, being resistant to the action of solvents and chemicals. In both these varnishes a suitable solvent such as varnoline is used for the application of the varnish.

Having thus described our invention, what we desire to claim and protect by Letters Patent is:

1. A surface contact filter comprising sheet material having a coating thereon of a modified cashew nut shell oil varnish, the surface of said sheet material being minutely pubescent and said varnish forming minute denticles at the cilia of said surface.

2. A surface contact filter of the character described comprising a base material and an acid and solvent resistant coating of modified cashew nut shell liquid thereon, said coating presenting surfaces which are minutely denticular.

EARLE D. CRAMMOND.
WILLIAM A. HUGHES.